US008926395B2

(12) United States Patent
Zheng

(10) Patent No.: US 8,926,395 B2
(45) Date of Patent: Jan. 6, 2015

(54) SYSTEM, METHOD, AND APPARATUS FOR INTERACTIVE PLAY

(75) Inventor: Yu "Brian" Zheng, Walnut, CA (US)

(73) Assignee: Patent Category Corp., Walnut, CA (US)

( * ) Notice: Subject to any disclaimer, the term of this patent is extended or adjusted under 35 U.S.C. 154(b) by 1659 days.

(21) Appl. No.: 11/946,363

(22) Filed: Nov. 28, 2007

(65) Prior Publication Data

US 2009/0137185 A1    May 28, 2009

(51) Int. Cl.
*A63H 3/52* (2006.01)
*A63F 13/98* (2014.01)
*A63H 11/00* (2006.01)
*A63F 13/40* (2014.01)

(52) U.S. Cl.
CPC .......... *A63F 13/02* (2013.01); *A63F 2300/201* (2013.01); *A63H 11/00* (2013.01); *A63F 13/10* (2013.01); *A63F 2300/301* (2013.01); *A63F 2300/401* (2013.01); *A63H 2200/00* (2013.01); *A63F 2300/302* (2013.01)
USPC ............................ 446/268; 446/477; 446/484

(58) Field of Classification Search
USPC ........................................................ 446/268
See application file for complete search history.

(56) References Cited

U.S. PATENT DOCUMENTS

| 4,712,184 | A | 12/1987 | Haugerud |
| 4,770,416 | A | 9/1988 | Shimizu et al. |
| 5,026,058 | A | 6/1991 | Bromley |
| 5,212,368 | A | 5/1993 | Hara |
| 5,271,627 | A | 12/1993 | Russell et al. |
| D354,532 | S | 1/1995 | Tornquist et al. |
| 5,379,461 | A | 1/1995 | Wilmers |
| 5,411,259 | A | 5/1995 | Pearson et al. |
| 5,575,659 | A | 11/1996 | King et al. |
| 5,607,336 | A | 3/1997 | Lebensfeld et al. |
| 5,686,705 | A | 11/1997 | Conroy et al. |
| 5,728,960 | A | 3/1998 | Sitrick |
| 5,746,602 | A | 5/1998 | Kikinis |

(Continued)

FOREIGN PATENT DOCUMENTS

| EP | 1486237 | 12/2004 |
| GB | 2 275 207 A | 8/1994 |

(Continued)

OTHER PUBLICATIONS

ISR/Written Opinion from PCT/US07/79566 dated Sep. 15, 2008.

(Continued)

*Primary Examiner* — Tramar Harper
(74) *Attorney, Agent, or Firm* — Raymond Sun

(57) ABSTRACT

A system, method and apparatus for interactive play is provided. In an exemplary embodiment, an interactive toy is provided. The interactive toy is configured to store a plurality of codes and display codes on a display on the toy. The codes can authenticate the toy and unlock functionality within a virtual world. In one embodiment, the interactive toy is configured to communicate with a user computer. Another embodiment provides methods for interactive play with an interactive toy and a virtual world. A further embodiment provides a computing device configured to participate in the interactive play system. This Abstract is provided for the purpose of complying with the Abstract requirement rules that allow a reader to quickly ascertain the subject matter of the disclosure contained herein. This Abstract is submitted with understanding that it will not be used to interpret or to limit the scope or the meaning of the claims.

25 Claims, 15 Drawing Sheets

(56) References Cited

U.S. PATENT DOCUMENTS

| | | |
|---|---|---|
| 5,749,735 A | 5/1998 | Redford |
| 5,766,077 A | 6/1998 | Hongo |
| 5,853,327 A | 12/1998 | Gilboa |
| 5,877,458 A | 3/1999 | Flowers |
| 6,012,961 A | 1/2000 | Sharpe, III et al. |
| 6,022,273 A | 2/2000 | Gabai |
| 6,056,618 A | 5/2000 | Larian |
| 6,086,478 A | 7/2000 | Klitsner et al. |
| 6,110,000 A | 8/2000 | Ting |
| 6,135,845 A | 10/2000 | Klimpert et al. |
| 6,201,947 B1 | 3/2001 | Hur |
| 6,227,968 B1 | 5/2001 | Suzuki et al. |
| 6,254,486 B1 | 7/2001 | Mathieu et al. |
| 6,290,565 B1 | 9/2001 | Galyean III et al. |
| 6,290,566 B1 | 9/2001 | Gabai et al. |
| 6,319,010 B1 | 11/2001 | Kikinis |
| 6,319,087 B1 | 11/2001 | Ferrigno |
| 6,357,566 B1 | 3/2002 | Pond |
| 6,410,835 B2 | 6/2002 | Suzuki et al. |
| 6,416,326 B1 | 7/2002 | Oh |
| 6,450,888 B1 | 9/2002 | Takase et al. |
| 6,460,851 B1 | 10/2002 | Lee et al. |
| 6,478,679 B1 | 11/2002 | Himoto |
| 6,497,606 B2 | 12/2002 | Fong |
| D470,540 S | 2/2003 | Seelig et al. |
| D471,540 S | 3/2003 | Tomino |
| 6,546,436 B1 | 4/2003 | Fainmesser et al. |
| 6,554,679 B1 | 4/2003 | Shackelford et al. |
| 6,558,225 B1 | 5/2003 | Rehkemper et al. |
| 6,585,556 B2 | 7/2003 | Smirnov |
| 6,595,780 B2 | 7/2003 | Singh et al. |
| 6,612,501 B1 | 9/2003 | Woll et al. |
| RE38,286 E | 10/2003 | Flowers |
| 6,648,719 B2 | 11/2003 | Chan |
| 6,661,405 B1 | 12/2003 | Flowers |
| 6,663,393 B1 | 12/2003 | Ghaly |
| 6,663,491 B2 | 12/2003 | Watabe et al. |
| 6,668,156 B2 | 12/2003 | Lynch et al. |
| 6,704,028 B2 | 3/2004 | Wugofski |
| 6,719,604 B2 | 4/2004 | Chan |
| 6,728,776 B1 | 4/2004 | Colbath |
| 6,732,183 B1 | 5/2004 | Graham |
| 6,733,325 B2 | 5/2004 | Sakai |
| 6,758,678 B2 | 7/2004 | Van Gilder et al. |
| 6,761,637 B2 | 7/2004 | Weston |
| 6,773,325 B1 | 8/2004 | Mawle et al. |
| 6,801,815 B1 | 10/2004 | Filo et al. |
| 6,801,968 B2 | 10/2004 | Hunter |
| 6,811,491 B1 | 11/2004 | Levenberg et al. |
| 6,814,662 B2 | 11/2004 | Sasaki et al. |
| 6,814,667 B2 | 11/2004 | Jeffway, Jr. et al. |
| 6,877,096 B1 | 4/2005 | Chung |
| 6,949,003 B2 | 9/2005 | Hornsby et al. |
| 7,033,243 B2 | 4/2006 | Hornsby et al. |
| 7,035,583 B2 | 4/2006 | Ferringino et al. |
| 7,054,949 B2 | 5/2006 | Jennings |
| 7,073,191 B2 | 7/2006 | Srikantan et al. |
| 7,096,272 B1 | 8/2006 | Raman |
| 7,117,439 B2 | 10/2006 | Barrett et al. |
| 7,118,482 B2 | 10/2006 | Ishihara et al. |
| 7,120,653 B2 | 10/2006 | Alfieri et al. |
| 7,131,887 B2 | 11/2006 | Hornsby et al. |
| 8,128,450 B2 * | 3/2012 | Imai ................... 446/14 |
| 2002/0028710 A1 | 3/2002 | Ishihara et al. |
| 2002/0073084 A1 | 6/2002 | Kauffman et al. |
| 2002/0111808 A1 | 8/2002 | Feinberg |
| 2002/0125318 A1 | 9/2002 | Tatsuta et al. |
| 2003/0148700 A1 | 8/2003 | Arlinsky et al. |
| 2004/0043365 A1 | 3/2004 | Kelley et al. |
| 2004/0081110 A1 | 4/2004 | Koskimies |
| 2004/0087242 A1 | 5/2004 | Hagerman et al. |
| 2004/0127140 A1 | 7/2004 | Kelly et al. |
| 2004/0191741 A1 | 9/2004 | Ferringino et al. |
| 2004/0197757 A1 | 10/2004 | Musolf |
| 2004/0203317 A1 | 10/2004 | Small |
| 2004/0214642 A1 | 10/2004 | Beck |
| 2004/0259465 A1 | 12/2004 | Wright et al. |
| 2005/0009610 A1 | 1/2005 | Miyamoto et al. |
| 2005/0048457 A1 | 3/2005 | Ferringino et al. |
| 2005/0216936 A1 | 9/2005 | Knudson et al. |
| 2005/0250415 A1 * | 11/2005 | Barthold ................ 446/465 |
| 2007/0203685 A1 * | 8/2007 | Takano .................. 703/23 |
| 2008/0004111 A1 | 1/2008 | Prather et al. |
| 2008/0081694 A1 * | 4/2008 | Hong et al. ............. 463/34 |
| 2008/0096661 A1 * | 4/2008 | Ikeda et al. ............. 463/40 |
| 2009/0019541 A1 * | 1/2009 | Fontijn ................. 726/19 |
| 2009/0053970 A1 * | 2/2009 | Borge .................. 446/268 |
| 2009/0176432 A1 * | 7/2009 | Hardin et al. ............ 446/8 |

FOREIGN PATENT DOCUMENTS

| | | |
|---|---|---|
| KR | 10-2003-0057497 | 7/2003 |
| WO | WO 84/00503 | 2/1984 |
| WO | WO99/64657 | 12/1999 |
| WO | WO 00/09229 | 2/2000 |
| WO | WO 01/97937 | 12/2001 |
| WO | WO 02/47013 | 6/2002 |
| WO | WO2004/006197 | 1/2004 |
| WO | WO 2004/054123 | 6/2004 |

OTHER PUBLICATIONS

ISR/Written Opinion from PCT/US07/16549—Aug. 21, 2008.
European Search Report dated Jun. 6, 2007 for European Application No. 06021643.9.
Extended European Search Report dated Aug. 20, 2007 for European Application No. 06021643.9.
ISR/Written Opinion from corresponding PCT/US08/057124—dated Jul. 29, 2008.
ISR/Written Opinion from corresponding PCT/US08/80621—dated Jul. 31, 2008.

* cited by examiner

SYSTEM, METHOD, AND APPARATUS FOR INTERACTIVE PLAY

FIELD OF THE INVENTION

The present invention relates generally to an interactive system. More particularly the present invention concerns a system, apparatus, and methods for interactive play.

BACKGROUND OF THE INVENTION

Interactive toys have become increasingly popular in recent times. Children enjoy playing with toys that communicate or respond to different selections or prompts from the player. For example, U.S. Pat. No. 6,663,393 (Ghaly) U.S. Pat. No. 5,607,336 (Lebensfeld et al.), U.S. Pat. No. 6,648,719 (Chan) and U.S. Pat. No. 6,585,556 (Smirnov) all disclose toys, dolls or action figures who act or respond based on some activation by the user, or by the surrounding events.

Additionally, online gaming has seen an explosion in popularity. Typical online gaming scenarios, sometimes referred to as Massively Multi-player On-Line(MMO) games are played on networks, such as the Internet with many people, are provided by servers on the network to user computers. A user may interact with the MMO, also referred to as a "virtual world", by interacting with the user's computer.

Entertainment systems involving toys and online virtual worlds are known in the art. These systems typically integrate virtual representations of toys into the virtual world allowing a user to visualize the toy and interact with the toy online. These systems bring certain advantages in that they allow the user to identify the toy with actions online. The interaction with the virtual world may increase the attachment of the user to the toy and to the manufacturer making other toys capable of virtual world interaction. These systems are somewhat limited in their interactive functionality.

It would be advantageous for the user of an interactive toy to take part in a virtual world where interactions with the toy could alter the users experience in the virtual world. Additionally, it would be advantageous for interactions within the virtual world to effect the interactive toy. Therefore, a need exists for a system, methods, and apparatus for interactive play.

SUMMARY OF THE INVENTION

The present invention provides a system, apparatus and methods for overcoming some of the difficulties presented above. In an exemplary embodiment, a method of an interactive toy the toy is configured to contain a body with a display, a memory and a processor. In this embodiment, the display is preferably a LCD display integrated into the body of the toy. As used herein, the terms "toy" and "interactive toy" are not limited by the appearance of the toy. For example, in some embodiments, the term "toy may refer to a doll, a doll with a robot appearance, a plush toy such as a teddy-bear, a toy car, a key-chain, or virtually any other interactive device designed for play. In an exemplary embodiment, the processor is connected to the display and to the memory. The memory contains a set of computer executable instructions sufficient to, when executed by the processor, display an authentication code on the display. In an exemplary embodiment the code displayed may be entered by a user into a computer connected to a network. Once the code is authenticated by a server on the network, the user is allowed to participate in games within a virtual online world.

One feature of this embodiment is that the virtual world in some instances contains a virtual character with an appearance similar to the interactive toy. By entering the authentication code, the virtual world may be configured to provide an experience to the user that corresponds with the interactive toy. Further, in some embodiments, the interactive toy is configured with a set of codes. The processor executable instructions within the toy configure the processor to display codes from this set based on parameters. Exemplary, but not limiting parameters include interaction with the toy, a level of points achieved with play with the toy, and a periodic time basis.

In a another embodiment an interactive play system is provided. In this embodiment the play system includes an interactive toy, as described above, but also includes a user computer connected to a network, such as the internet. In this embodiment, the user computer is configured to allow the user to input the authentication code through a keyboard and it is communicated to a server on the network. Once authenticated, the server serves a virtual world to the user computer over the network. In one embodiment, the virtual world is displayed on the display of the user computer through a web-browser interface. The web-browser interface, in some embodiments, includes a software plug-in, such as a flash player, that is capable of displaying the virtual world on the user computers display. The software plug-in in some embodiments, may write a file to the user computer containing information related to interaction within the virtual world.

In another embodiment, a method of interactive play is provided. In this embodiment, an authentication code is displayed on the display of an interactive toy. The is then authentication code is authenticated on a server on a network. A virtual world is then provided by the server to a user computer. Periodically, codes from a set stored in the interactive toy's memory are additionally displayed. When these codes are authenticated on the server, additional functionality is imparted to the virtual world. The display of these codes in an exemplary and non-limiting embodiment are on a basis such as a timed basis, based on interaction with the interactive toy, achieving a point total in game play with the interactive toy, or interaction with the virtual world.

In a still further embodiment, a computing apparatus is provided in this embodiment, the computing apparatus includes a display, a processor, a memory, a communications transceiver, and a keyboard. The computing apparatus is connected to a network, such as the Internet, through a communications port. In this embodiment, the computing apparatus contains processor executable instructions that, when executed by the processor, configure the computing apparatus to authenticate an interactive toy on a server on the network. Further, the computing apparatus is configured to display a virtual world on its display. In some embodiments, entering codes displayed on the display of the interactive toy impart additional functionality to the virtual world. In other embodiments, interacting with the virtual world causes the instructions to write a file containing information about the interaction.

In some embodiments, the computing apparatus is connected to the interactive toy. In these embodiments, both the computing apparatus and the interactive toy include a communications transceiver and communications port enabling communication between the computing apparatus and the interactive toy. In an exemplary embodiment, the computing apparatus contains machine executable instructions that, when executed by the processor, configure the computing apparatus to interpret the file written by the virtual world and cause an action on the interactive toy.

BRIEF DESCRIPTION OF THE DRAWINGS

Various embodiments of the present invention taught herein are illustrated by way of example, and not by way of limitation, in the figures of the accompanying drawings, in which.

Figure 1:
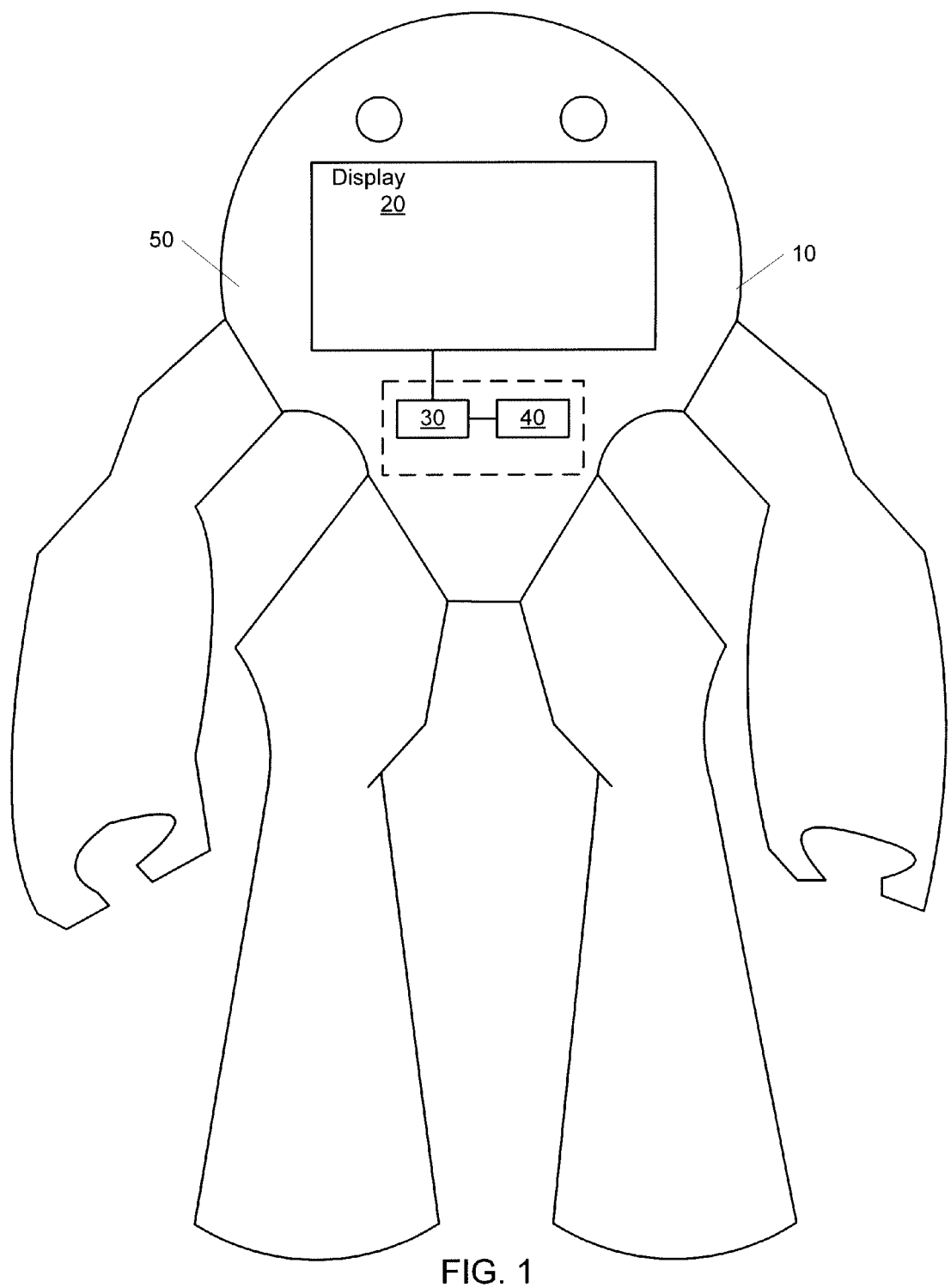
FIG. 1 illustrates an exemplary interactive toy consistent with various embodiments.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Interactive toys are increasingly popular. Interaction with most interactive toys occurs solely within the physical experience. These toys may contain lights, video displays, and speakers sufficient to provide an interactive experience with the user. User interaction may cause sounds to be emitted lights to flash or in some instances video to be displayed. Some interactive toys are additionally coordinated with virtual worlds provided through the internet. These toys allow for limited interaction for a user to experience their toy online.

One feature of the present invention is that it provides an interactive system that includes an interactive toy and an online virtual world. In this system a user may interact with a toy and through the interaction new functionality in "unlocked" in the virtual world. Further, in some embodiments, interaction with the virtual world causes the interactive toy to respond in some manner. Exemplary responses include video display, illumination of lights or Light Emitting Diodes, emission of sounds or music from speakers, and the like. Additionally, in some embodiments, new functionality may be imparted to the interactive toy based on interaction with the virtual world. As used herein, the terms "toy" and "interactive toy" are not limited by the appearance of the toy. For example, in some embodiments, the term "toy may refer to a doll, a doll with a robot appearance, a plush toy such as a teddy-bear, a toy car, a key-chain, or virtually any other interactive device designed for play.

One embodiment of a provided interactive toy is illustrated in FIG. 1. In this embodiment, interactive toy 10, illustrated as a robot, it contains a toy body 50. Mounted on toy body 50 is display 20. Within toy body 10 is processor 30 and memory 40. Processor 30 is connected to display 20. Memory 40 contains multiple codes. In this embodiment, processor 30 is configured to control content displayed on display 20. In an exemplary embodiment, memory 40 contains a set of processor executable instructions (software) that, when executed by processor 30, cause an authentication code to be displayed on display 20. As used herein the term "authentication code" refers to an alpha-numeric code unique to the toy. In some embodiments, this code may be used to authenticate the toy on a server on a network. In one embodiment, the set of processor executable instructions additionally configures the processor to periodically cause other codes to be displayed on display 20. In further embodiments, display 20 provides interactive games that can be played independent of a network.

This periodic display configuration may be on a periodic timed basis. For example, in one embodiment, memory 40 contains a set of 16 alpha-numeric codes. These codes may be displayed for a discrete time period over a number of days. On the first day code 1 may be displayed for 2 hours, and code 2 may be displayed for 3 hours. On the second day code 3 may be displayed for 6 hours followed by code 1 for 1 hour. In this manner the display may cycle through various combinations of codes in different days. In another embodiment, the periodic display may be controlled by interaction with interactive toy 10. In this embodiment, processor 30 may track the interaction a user is having with the toy and once a threshold is reached cause a code to be displayed on display 20. In a further embodiment, interactive toy 10 is configured with a number of games and controls. Video portions of these games may displayed on display 20. As a user interacts with the game processor 30 records points achieved by the user in game-play. Once a certain point total is achieved, processor 30 causes a code to be displayed on display 20.

One feature of this embodiment is the displayed codes allow the user to interact with a "virtual world" through the use of a user computer. In one embodiment, the user computer is connected to a server on a network and the authentication code is entered a webpage and interactive toy 10 is authenticated on the network. In this embodiment, once the authentication code is received by the server, a query is run on a database. The results of the query are checked to determine if the authentication code is present in the database, and if so an account is created for the user and interactive toy 10 is authenticated on the network. In another embodiment, the server additionally hosts the virtual world and serves it to the user computer via the network. On the user computer, the virtual world is displayed for the user to interact with.

Various provided embodiments utilize communication technologies and networks. As is known in the art, networks can be classified in a number of ways. A network may be classified by the range supported by the underlying technology. For example, some network technologies are designed to provide communication across significant ranges. The Public Switched Telephone Network (PSTN) is a network with almost global reach. Significant portions of the PSTN comprise a wired infrastructure. Portions of the PSTN comprise optical fiber media. Other portions of the PSTN infrastructure may include microwave or radio frequency links communicating across a wireless medium. Wireless and cellular telephone networks interface to the PSTN.

The development of cellular networks has evolved over time. Initially, cellular networks only supported voice traffic. More recently, data technologies have been enabled across these networks. One of the earlier cellular based data technologies was General Packet Radio Service (GPRS). GPRS is packet based wireless communication service that provides data communication services in the 50 to 100 Kilobit per second (Kbps) speed range. The GPRS standard is based on the Global System for Mobile (GSM) standard and compliments existing services such as circuit switched cellular phone connections and the Short Message Service (SMS). As used herein, the terms circuit switched and packet switched refer to types of network connections. Circuit switched connections are typically dedicated connections between users during the entirety of the communication. Packet switched refers to a connection in which packets are routed across a network based on destination and source addresses of the packets.

Other cellular based data technologies exist and others are currently under development, Enhanced Data GSM Environment (EDGE) is a faster data transfer technology capable of data rates up to almost 400 Kbps. Like GPRS, EDGE is based on the GSM standard and uses the GSM Time Division Multiple Access (TDMA) frame structure. Cellular or mobile based data technologies continue to evolve. The High Speed Downlink Packet Access (HDSPA) is one of the next steps in the evolution of the Universal Mobile Telecommunications Service (UMTS). The goal of UMTS is to provide up to 2 Megabits per second (Mbps) to the user which will allow the transmission of text, video, voice multi-media and other services. Other Third Generation (3G) cellular efforts are additionally based on the GSM architecture. The CDMA2000 based data services include Evolution Data Optimized (EV-DO) and 1X-EVDO may additionally be employed to practice aspects of the present invention. (CDMA2000 is a registered trademark of the Telecommunications Industry Association).

Other types of data networks, may or may not interface with voice networks. These networks may have essentially global ranges, such as the Internet. These networks may include wireless metropolitan area network technologies such as the technology currently referred to as WiMax. Metropolitan area networks may include wired or optical media as well as a wireless medium. Local area networks may be wired, typically employing twisted-pair wired media, or wireless. Wireless local area networks (WLANs) may include networks employing wireless technologies like Direct Sequence Spread Spectrum (DSSS) or Orthogonal Frequency Division Multiplexing (OFDM). These two wireless technologies are currently the basis for well known WLAN technologies commonly referred to as WiFi or 802.11a, b, g, and n.

Wireless networks may additionally be classified as Wireless Personal Area Networks (WPAN). Typically in WPAN technologies the data rates can be quite significant but the ranges may be limited to under 20 meters. One example of WPAN technology includes a frequency hopping spread spectrum technology, such as the technology currently known as BLUETOOTH (BLUETOOTH is a registered trademark of the Bluetooth Special Interest Group). Other WPAN technologies that are currently under development include Ultra-Wideband, which currently is being implemented as an impulse technology, a DSS technology, and a frequency hopping OFDM technology.

Some provided embodiment embodiments employ short range communication technologies. These low range technologies may include the WPAN technologies mentioned above or may comprise other low data rate low range communication transceivers.

Figure 2:
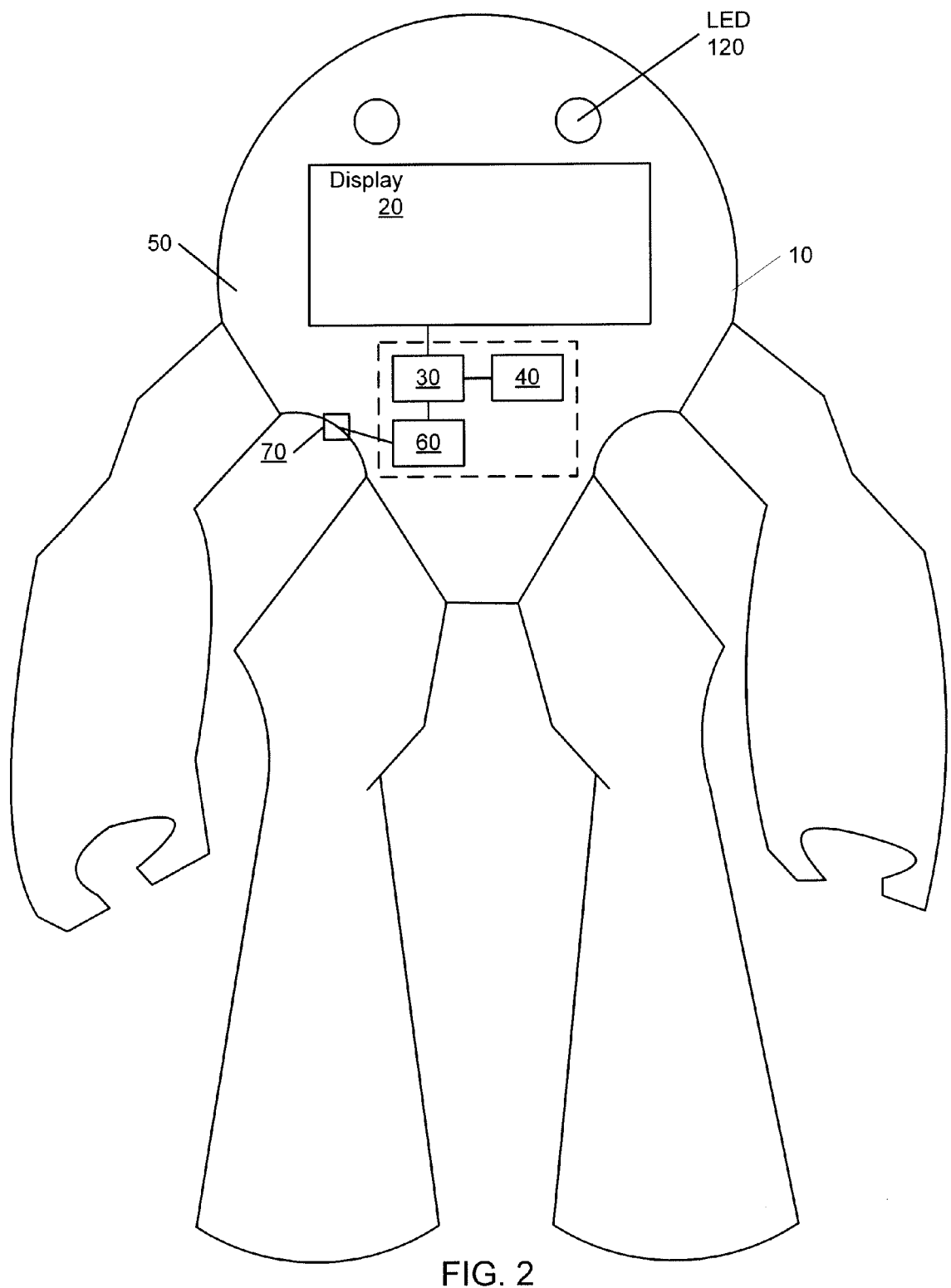
FIG. 2 illustrates an exemplary interactive toy consistent with various embodiments.

In another embodiment, illustrated in FIG. 2 interactive toy 10 contains a communications transceiver 60 and communications port 70. In this embodiment, interactive toy 10 may communicate codes directly to a users computer via a communications medium. Various embodiment may additionally include a number of Light Emitting Diodes and speakers (not shown) that assist in providing an interactive experience to a user. In various embodiments communications transceiver may be a wireless transceivers, a Universal Serial Bus (USB) transceiver, a FireWire transceiver, a RFID transceiver, a BlueTooth transceiver, a WiFi transceiver, an Ultra-Wideband transceiver, a modem transceiver, a wireless local area network transceiver, a wireless personal area network transceiver, a direct sequence spread spectrum transceiver, an orthogonal frequency division multiplexing transceiver, or a frequency hopping transceiver. Further communications port 70 in various embodiments may be a wireless communication port comprising an antenna, a wired media communication port, a USB port, a FireWire port, and a twisted pair wired media port.

As is known in the art USB ports allow connection of devices and communication through the use of Universal Serial Bus transceivers. USB is an alternative to Peripheral Component Interconnect (PCI) connectivity. Further, FireWire refers to an additional connection port and transceiver.

One feature of embodiments containing communications capabilities, is that interaction within the virtual world may be communicated to interactive toy 10 via communication port 70 and communications transceiver 60. For example, a user may achieve a point total or other interaction with a virtual copy of the interactive toy 10. In some embodiments, this achievement causes the server to send a communication to the user's computer. The user computer then communicates with interactive toy 10 causing an event to occur. Exemplary events include but are not limited to illumination of LEDs 120, emission of music or other sounds from the speaker (not shown), display of images or video on display 20, display of codes on display 20, or other such action.

Figure 3:
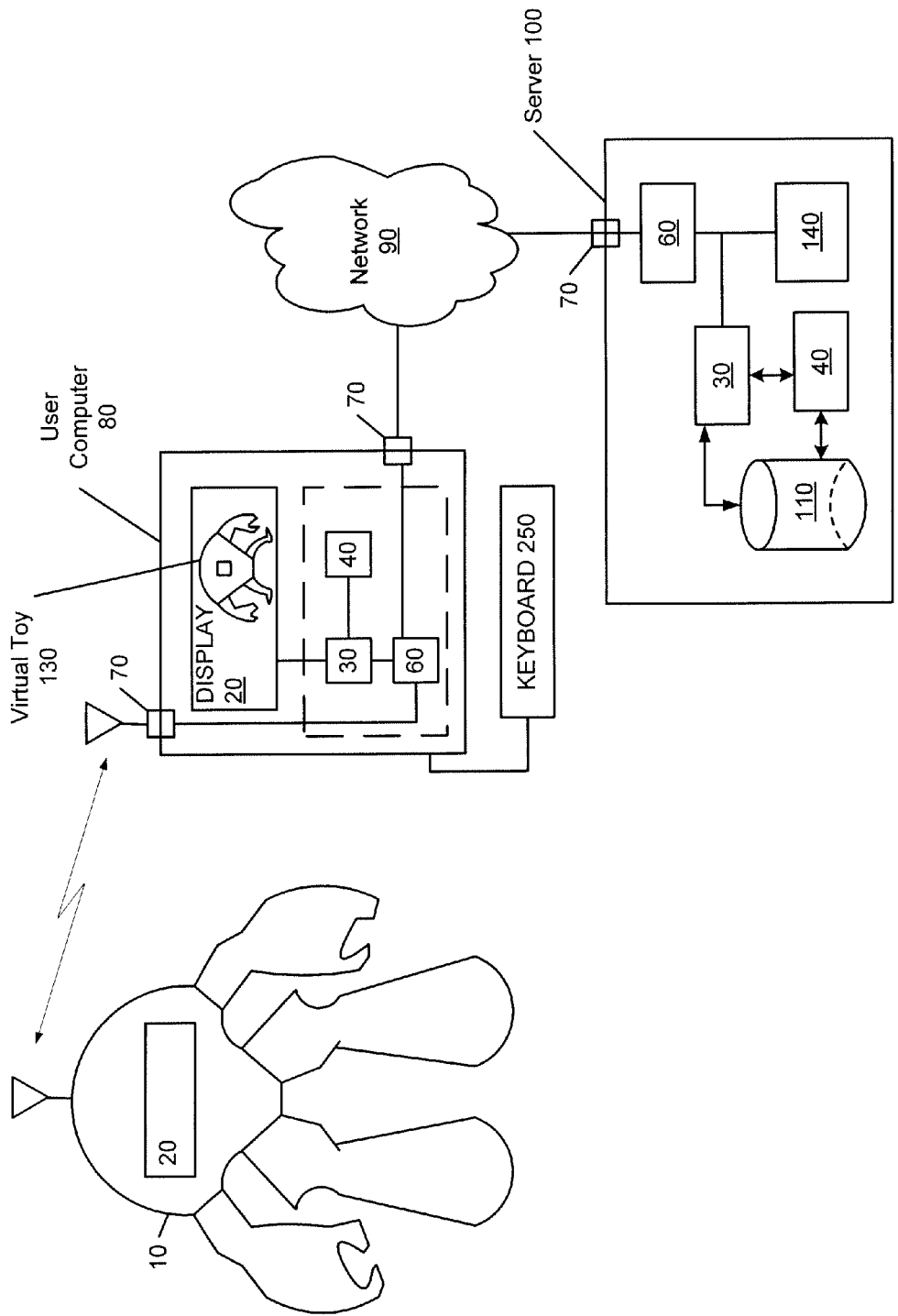
FIG. 3 illustrates and interactive play system consistent with various embodiments.

An exemplary embodiment of an interactive play system is illustrated in FIG. 3. The system includes an interactive toy 10 having a display 20. Other features, described above, are omitted from FIG. 3 for convenience. In this embodiment, Interactive toy 10 is configured to communicate with user computer 80 via a wireless communication medium. User computer 80 includes a display 20, a processor 30, memory 40, and communications transceiver 60. In some embodiments, user computer 80 may comprise additional communications transceivers 60 (one shown for convenience). User computer 70 additionally includes communications ports 70. In FIG. 3 one communications port 70 is illustrated with an antenna for wireless connectivity to interactive toy 10 and another communications port 70 is illustrated providing connection to network 90. As is known in the art, connection to network 90 may be through a wireless or wired media. User computer 80 is additionally illustrated with keyboard 250. Additional components are omitted for convenience.

One feature of an embodiment of interactive play system is that codes may be displayed on display 20 on interactive toy 10. In embodiments where interactive toy 10 does not include a communications transceiver 60 a user may enter the codes through keyboard 250. In other embodiments, codes may be communicated directly from interactive toy 10 to user computer 80 through communications transceivers 60 and communications ports 70.

Another feature of various embodiments of the interactive play system is that interactive toy 10 may be authenticated on server 100. Once authenticated, user computer 80 may display a virtual world environment on display 20 allowing a user to interact with the virtual world. In various embodiments, the virtual world contains a virtual toy 130 with an appearance of interactive toy 10. One aspect of an embodiment containing a virtual toy 130 is that user interactions with virtual toy 130 may cause events to happen on interactive toy 10. For example, a user may play a game in the virtual world that involves interactive toy 10. Once an event occurs in the virtual world, lights or LEDs 120 on interactive toy 10 may light, sounds or songs may be played on interactive toy 10, or images or video displayed on display 20 on interactive toy 10.

As described above, network 90 may be any form of network 90, but in an exemplary embodiment is the Internet. Server 100 is additionally connected to network 90 through communications port 70 and is configured to communicate with user computer 80 via communications transceiver 60. Server 100 contains a processor 30, memory 40, and in some embodiments storage media 140. Server 100 additionally includes database 110. One feature provided by embodiments of the interactive play system is that interactive toy 10 is authenticated on server 100 and a user is provided a virtual world on user computer 80. As the user interacts with the virtual world, server 100 stores data related to interactive toy 10, the user, and his/her activities in the virtual world. As a user achieves certain objectives in the virtual world, accrued points and other data, such as a set of codes for each interactive toy 10, are stored on storage medium 140. Once point totals exceed a threshold value, or other objectives are met, server 100 communicates the accomplishment back to user computer 80 which, in some embodiments, are communicated to interactive toy 10.

Further, as described above, interactive toy 10 periodically displays codes on display 10. These codes, once authenticated on server 100 may provide additional features to the virtual world. For example, a user's virtual toy 130 may be enabled with additional functionality, secret rooms or spaces may be opened for virtual toy 130 to explore, additional virtual point totals may be assigned, access to additional virtual worlds, access to additional virtual objects, access to additional virtual cash, and access to additional virtual games to name a few. In some embodiments, each code displayed is unique to an add-on functionality. Further, in some embodiments are displayed on a time periodic basis, they may expire if not authenticated within a predetermined time period.

In various embodiments, the virtual world hosted and served by server 100, is displayed on user computer 80 through a web-browser interface. In one such embodiment the web-browser interface contains a plug-in that allows animation and control. Many browser plug-ins are well known in the art and may be used to practice the current invention. An exemplary plug-in is a flash control plug-in. The browser-interface and plug-in are configured to provide a graphical and in some instances audible experience to a user.

Figure 4:
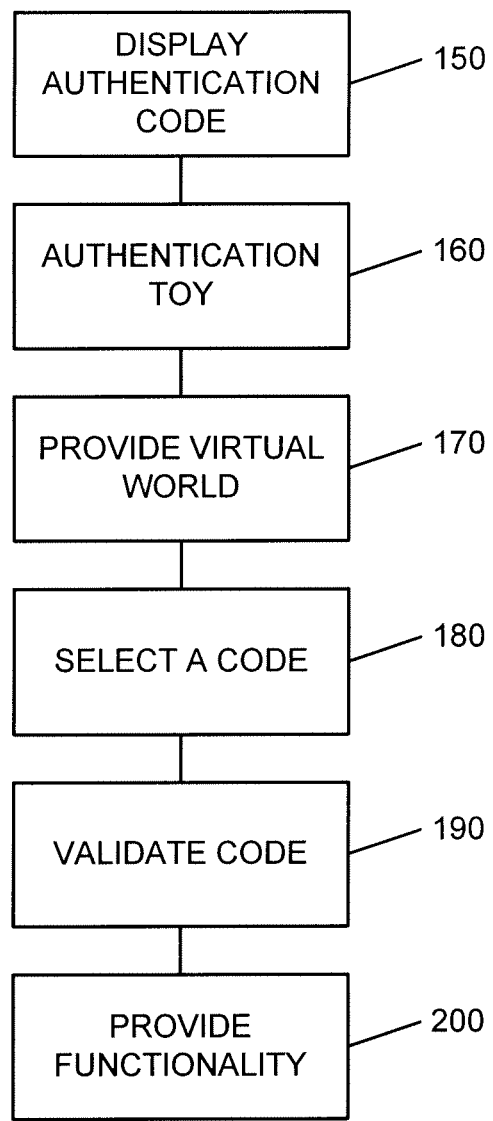
FIG. 4 illustrates the flow consistent with provided methods.

An exemplary provided method is illustrated in FIG. 4. Flow begins in block 150 where an authentication code is displayed on the display 20 of an interactive toy 10. In block 160 the toy is authenticated on a server 100 on network 90. Flow continues to block 170 where server 100 provides a virtual world to a user computer 80. In block 180 a code is selected from a set of codes contained in memory 40 of interactive toy 10. In this embodiment, the selected code is not displayed on display 20 of interactive toy 10. This code is validated in block 190. Flow continues to block 200 where additional functionality is provided by server 100. In some embodiments The codes are entered into user computer 80 through keyboard 250. In other embodiments codes are communicated from interactive toy 10 to user computer 80 through the use of communications transceivers 60 and communications ports 70. User computer 80 then communicates the codes to server 100 across network 90. Authentication or validation of a code at server 100 may comprise executing a query on database 110 to determine if the code is stored in database 110. As discussed above, the additional functionality provided in block 200 may be additional functionality within the virtual world or in some embodiments may be additional functionality communicated to interactive toy 10.

Figure 5:
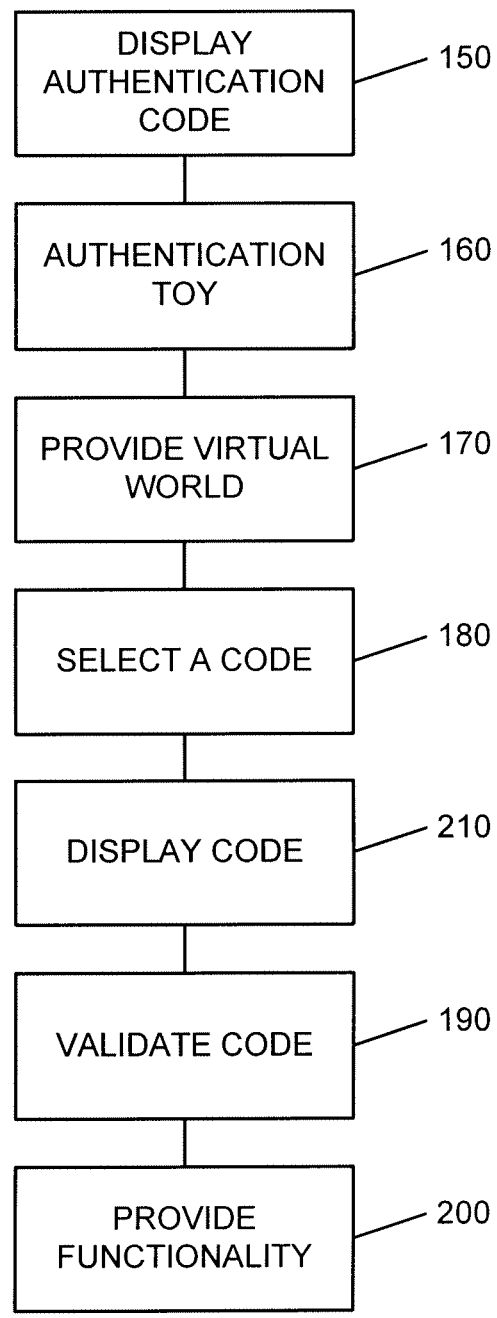
FIG. 5 illustrates the flow consistent with provided methods.

FIG. 5 illustrated an additional embodiment of a provided method. Like the above embodiment flow begins at block 150 where an authentication code is displayed on the display 20 of an interactive toy 10. In block 160 the toy is authenticated on a server 100 on network 90. Flow continues to block 170 where server 100 provides a virtual world to a user computer 80. In block 180 a code is selected from a set of codes contained in memory 40 of interactive toy 10. Flow continues to block 210 where the selected code is displayed on display 20 of interactive toy 10. Flow continues to block 200 where additional functionality is provided by server 100. The remainder of the method is the same as the method illustrated in FIG. 4.

Figure 6:
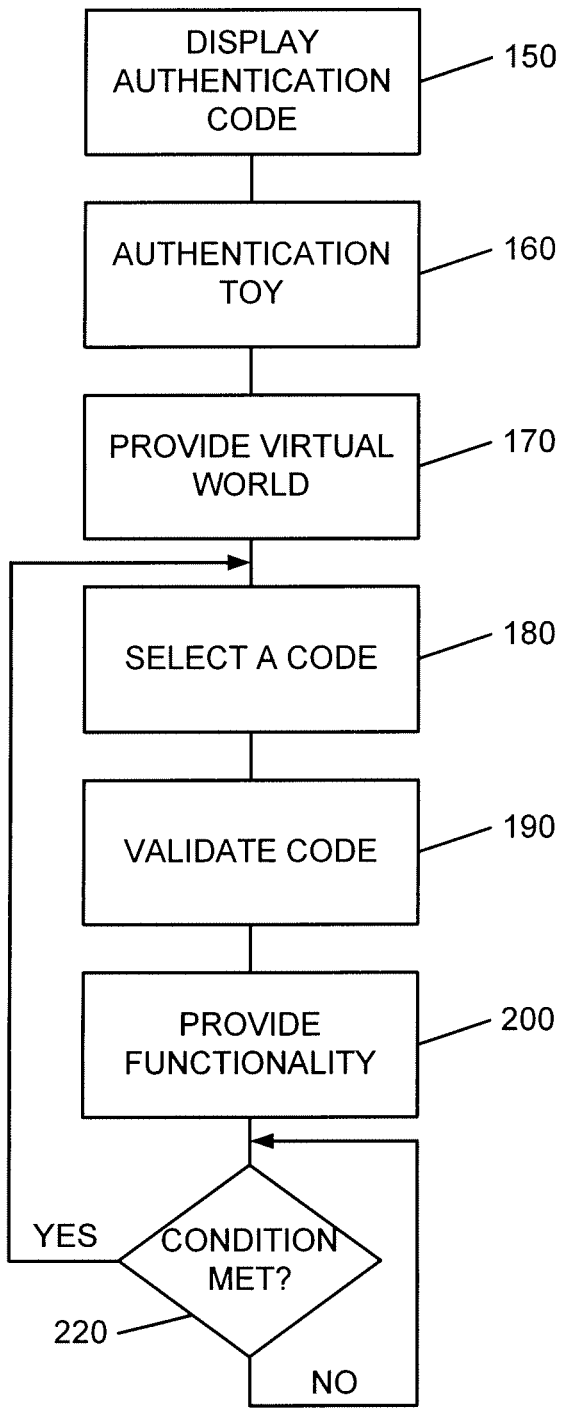
FIG. 6 illustrates the flow consistent with provided methods.

FIG. 6 illustrates another embodiment of a provided method. This embodiment functions the same as FIG. for with the exception of conditional block 220. In this block interactive toy 10 determines is an appropriate condition is met before selecting and displaying a code. Until the condition is met the method remains in condition block 220. Once the condition is met flow continues back to block 180 where a new code is selected. As discussed above, in various embodiments codes are released based meeting conditions. One condition is passage of time. In this embodiment, codes are selected and displayed on a time periodic basis. Another condition is a level of interaction with the interactive toy 10. A further condition is the achievement of a point total in a game.

Figure 7:
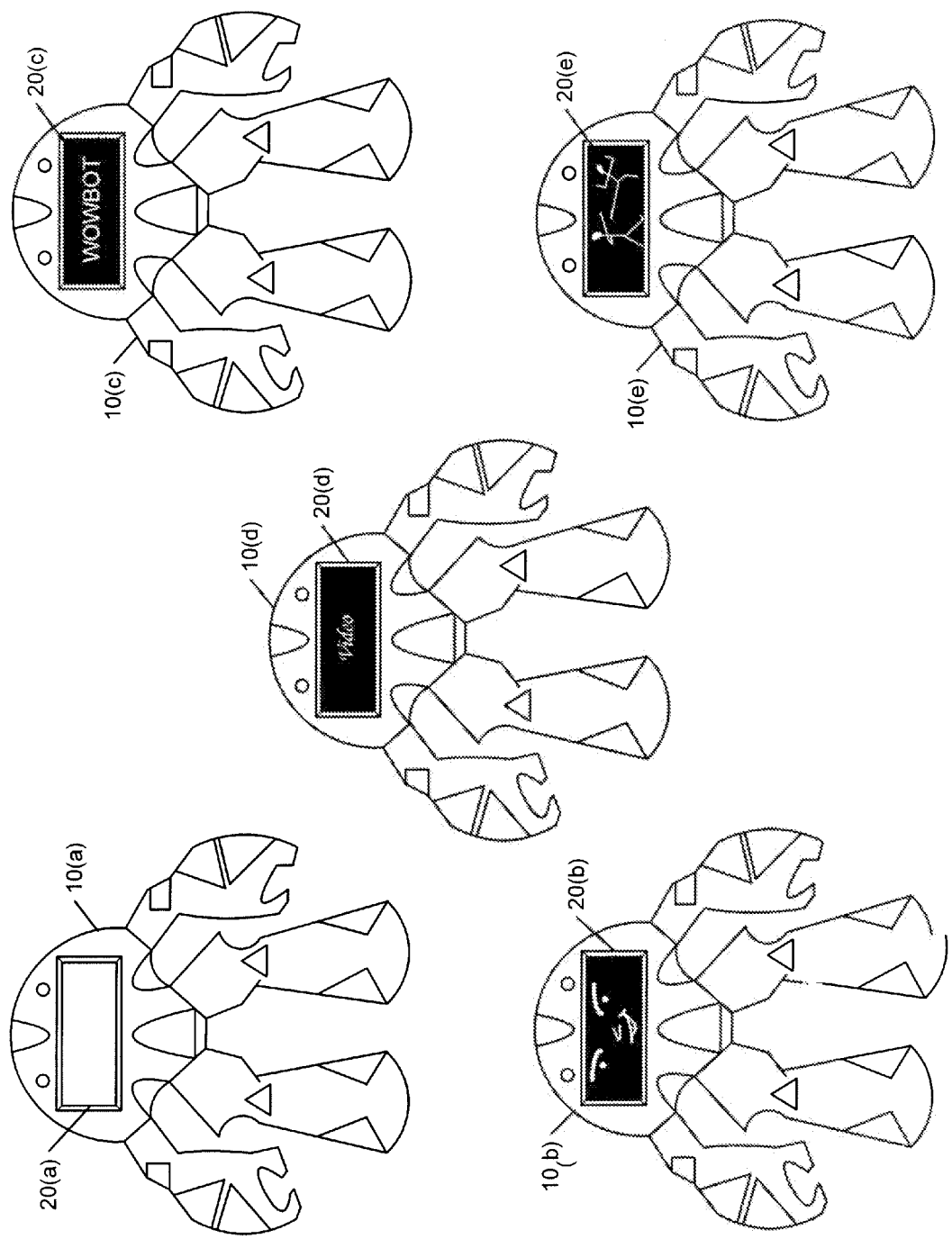
FIG. 7 is a further illustration of exemplary interactive toys consistent with various embodiments.
Figure 8:
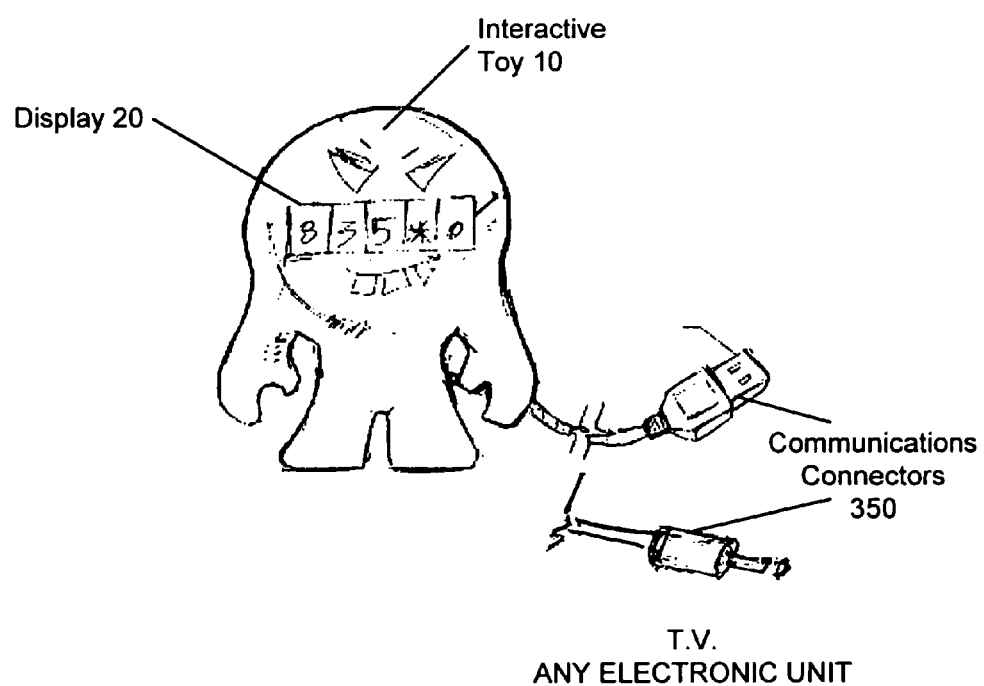
FIG. 8 illustrates another exemplary interactive toy consistent with various embodiments.

FIGS. 7-12 illustrate various embodiments of interactive toy 10. Embodiments of interactive toy 10(a) through 10(e), shown in FIG. 7 illustrate exemplary functionality of displays 20(a) through 20(e). In some embodiments like display 20(c) may be used to display messages or advertisements. In other embodiments, illustrated in interactive toy 10(d), display 20(d) may be used to display video or still imagery, in further embodiments, illustrated in interactive toy 10(e), display 20(e) is used to display a video game. In another embodiment of interactive toy 10(b), display 20(b) is used to display a mood. FIG. 8 illustrates another embodiment of interactive toy 10, configured with display 20 and communications connector 350. As is known in the art, this embodiment contains communications transceivers and ports capable of communications on communications connector 350. In this embodiment, communications connector 350 may be any wired media connector, such as a USB, FireWire, twisted pair, S-Video, or coaxial connector to name a few examples.

Figure 9:
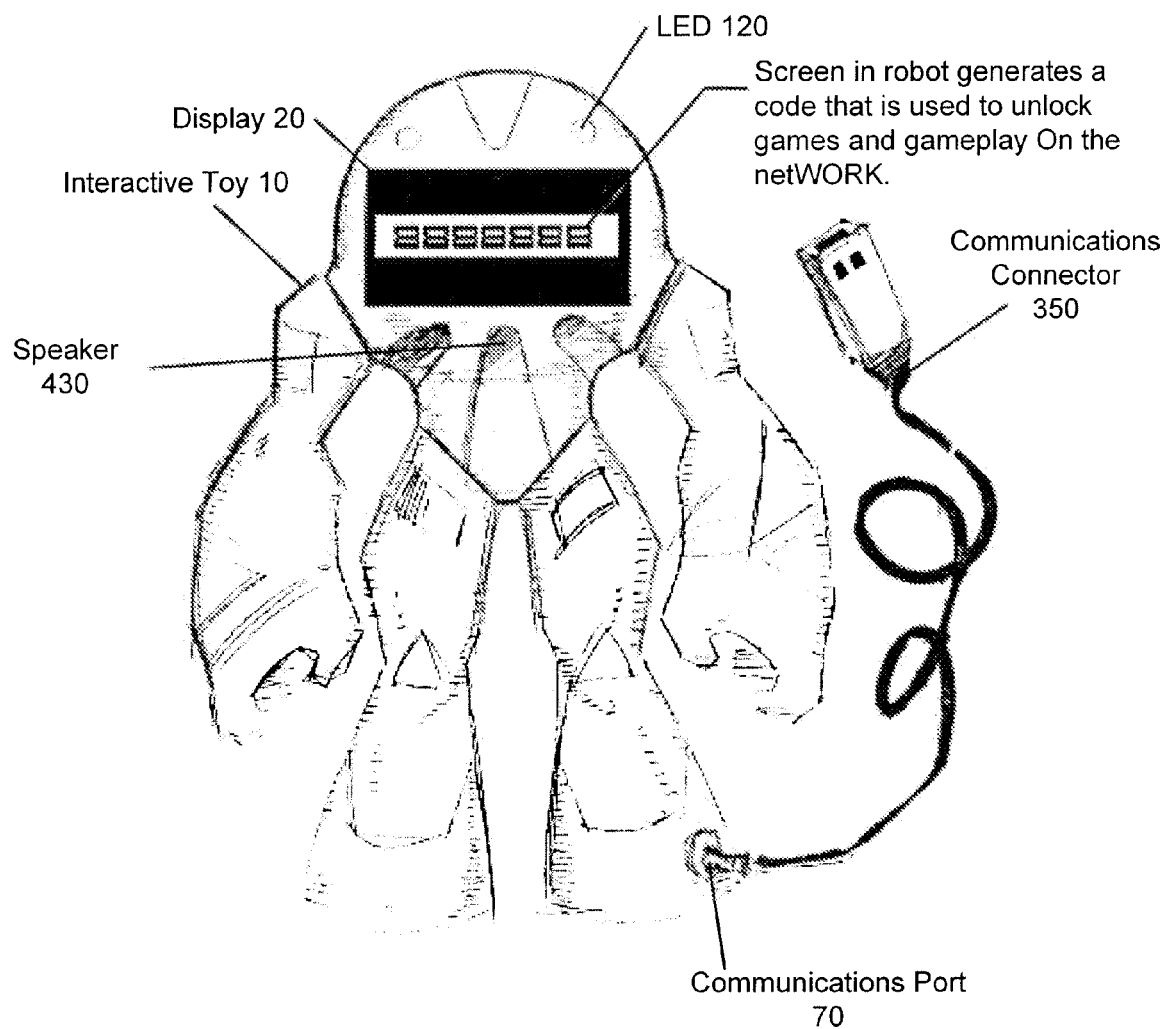
FIG. 9 illustrates another exemplary interactive toy consistent with various embodiments.
Figure 10:
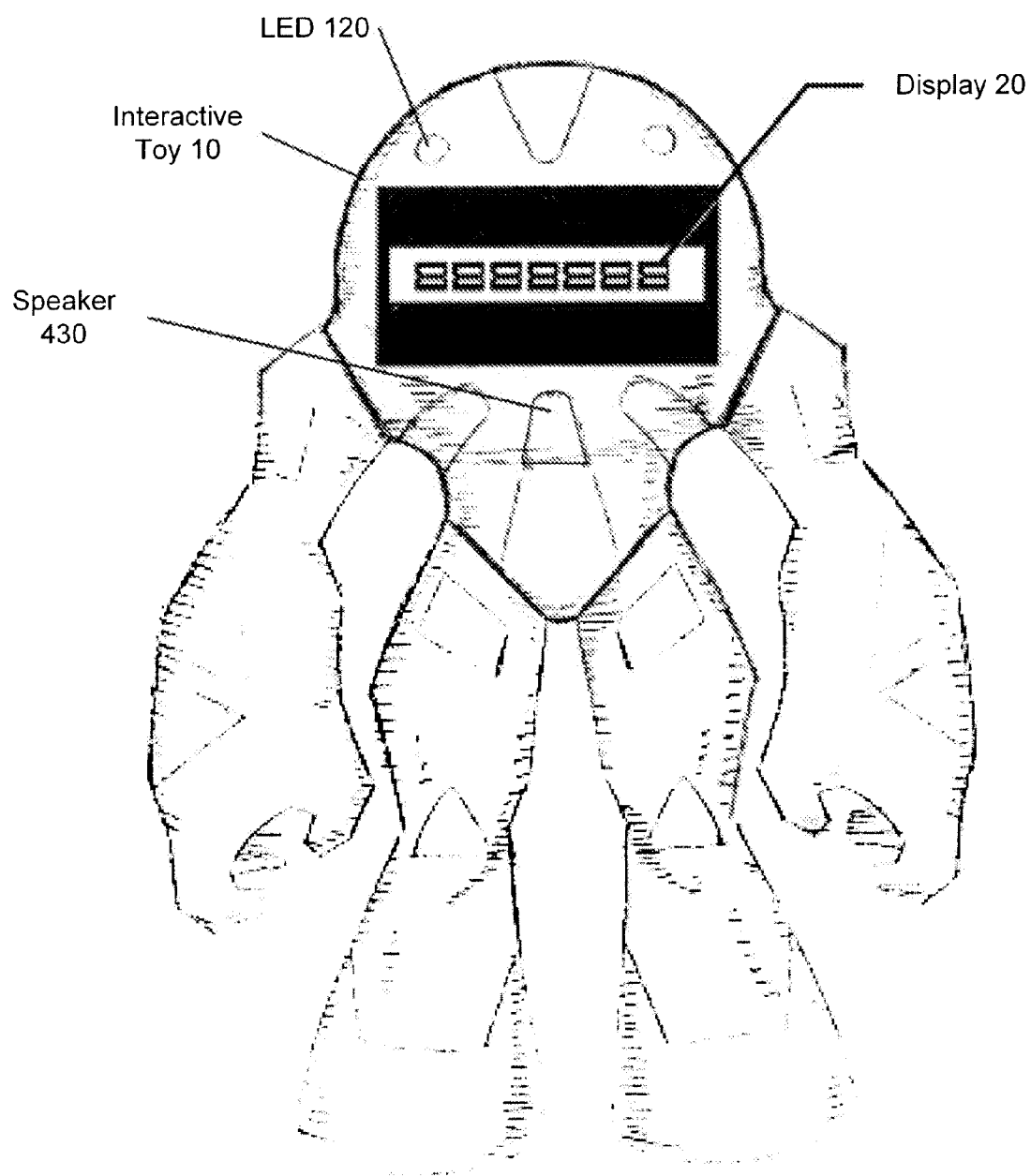
FIG. 10 illustrates another exemplary interactive toy consistent with various embodiments.

Another embodiment of interactive toy 10 is illustrated in FIG. 9. In this embodiment interactive toy 10 is equipped with display 20, capable of displaying alpha-numeric codes, LED 120, speaker 430, communications port 70 and communications connector 350. One feature of this embodiment is that it is able to communicate codes directly to user computer 80, and receive communications from user computer 80, through communications port 80 and communications connector 350. An alternate embodiment is illustrated in FIG. 10. A primary distinction between this and the embodiment illustrated in FIG. 9, is this embodiment is not equipped with the ability to communicate with user computer 80. A feature of this embodiment is that codes displayed on display 20 must be manually entered into user computer 80 with keyboard 250.

Figure 11:
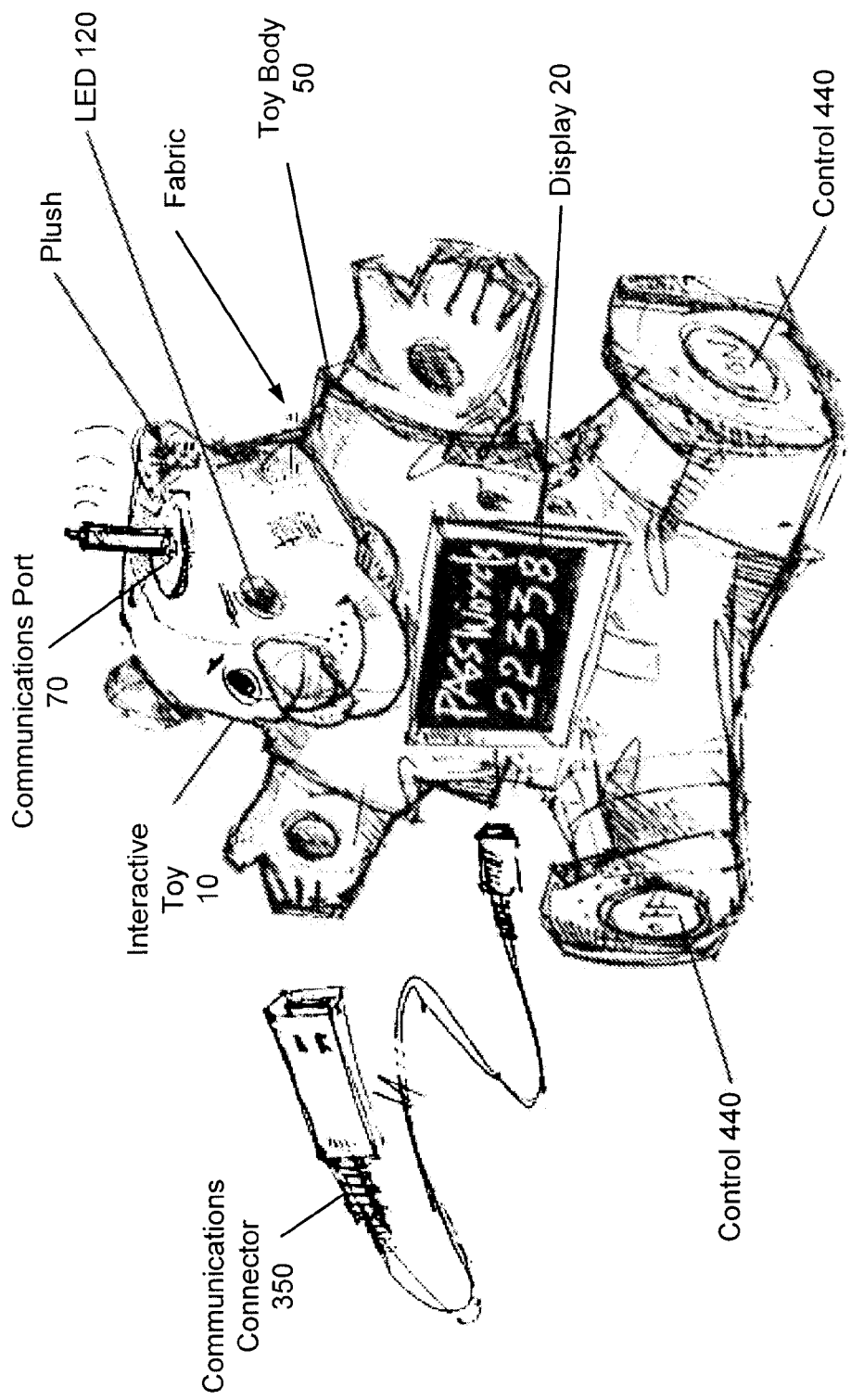
FIG. 11 illustrates another exemplary interactive toy consistent with various embodiments.

FIG. 11 illustrated a further embodiment of interactive toy 10. In this embodiment, toy body 50 is fabric and interactive toy 10 is a stuffed "plush" toy. FIG. 11 further illustrates multiple communications ports 70, which require multiple communications transceivers 60. One communications transceiver being suitable for wired media communication over communications connector 350, another being suitable for communication over a wireless medium. FIG. 11 further illustrates embodiments of interactive toy 10 that include controls 440. Controls 440, depicted here as on/off controls, in some embodiments include controls sufficient to control a video game displayed on display 20.

Figure 12:
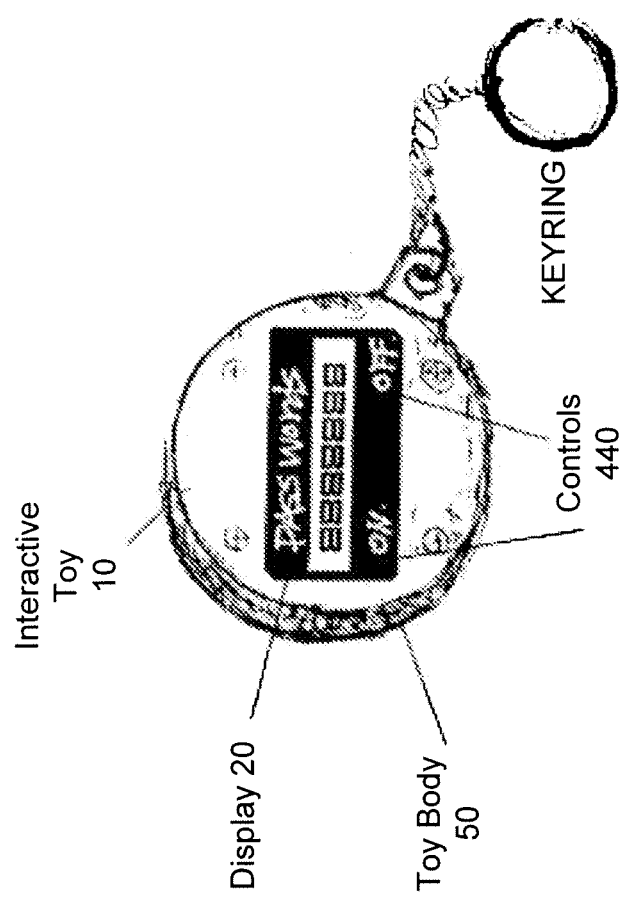
FIG. 12 illustrates another exemplary interactive toy consistent with various embodiments.

A further embodiment of interactive toy 10 is illustrated in FIG. 12. In this embodiment interactive toy 10 is a key chain having a toy body 50, display 20 and controls 440 as stated above, in embodiments where interactive toy 10 is capable of displaying a video game on display 20, further controls 440 are present allowing a user to interact with the video game. One feature of this embodiment is that in embodiments where codes are displayed on a time periodic basis, a user is able to carry interactive toy 10 with them throughout the day and record the code when displayed ensuring they do not miss the display.

Figure 13:
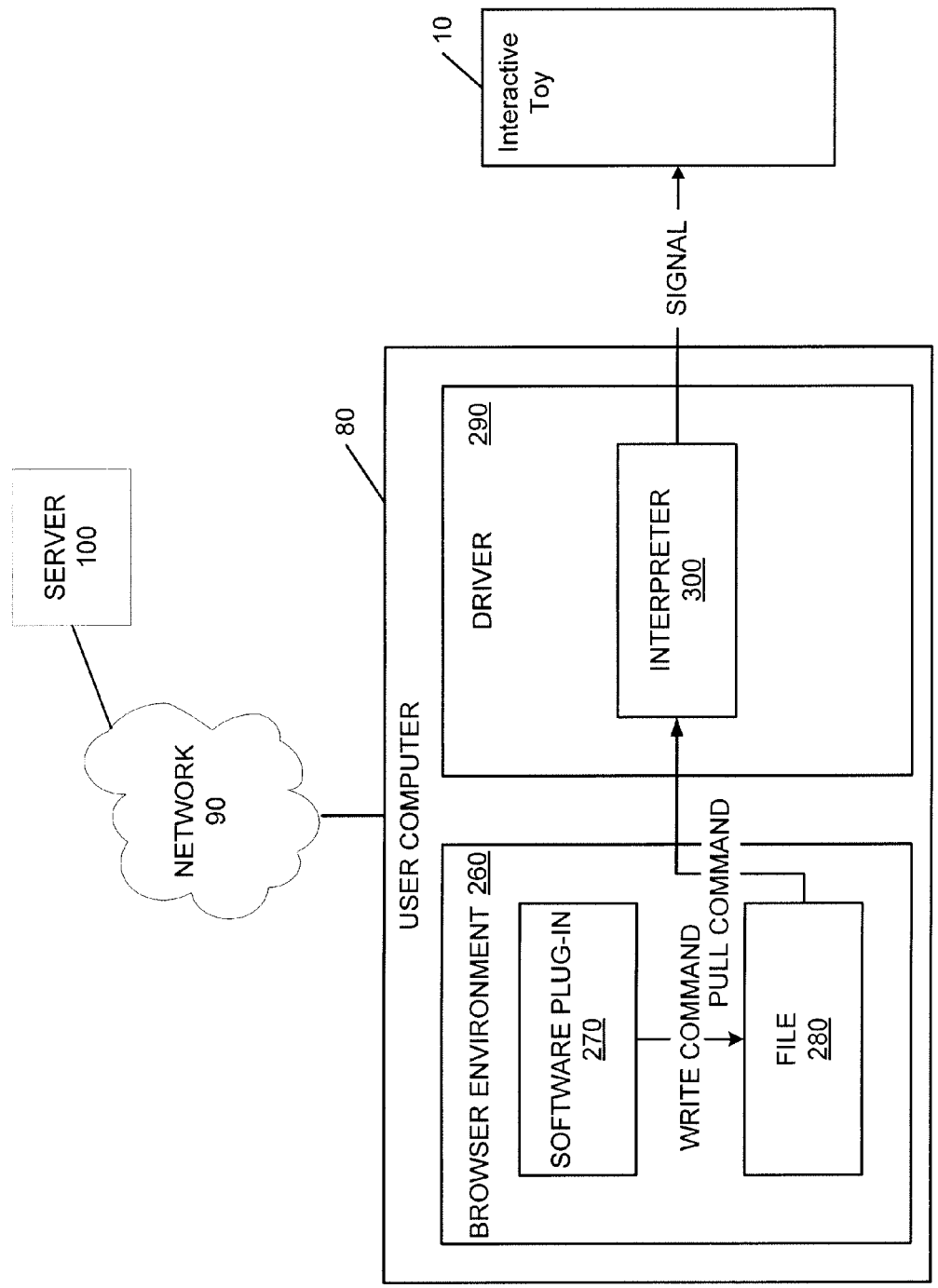
FIG. 13 illustrates a computing apparatus consistent with provided embodiments.
Figure 14:
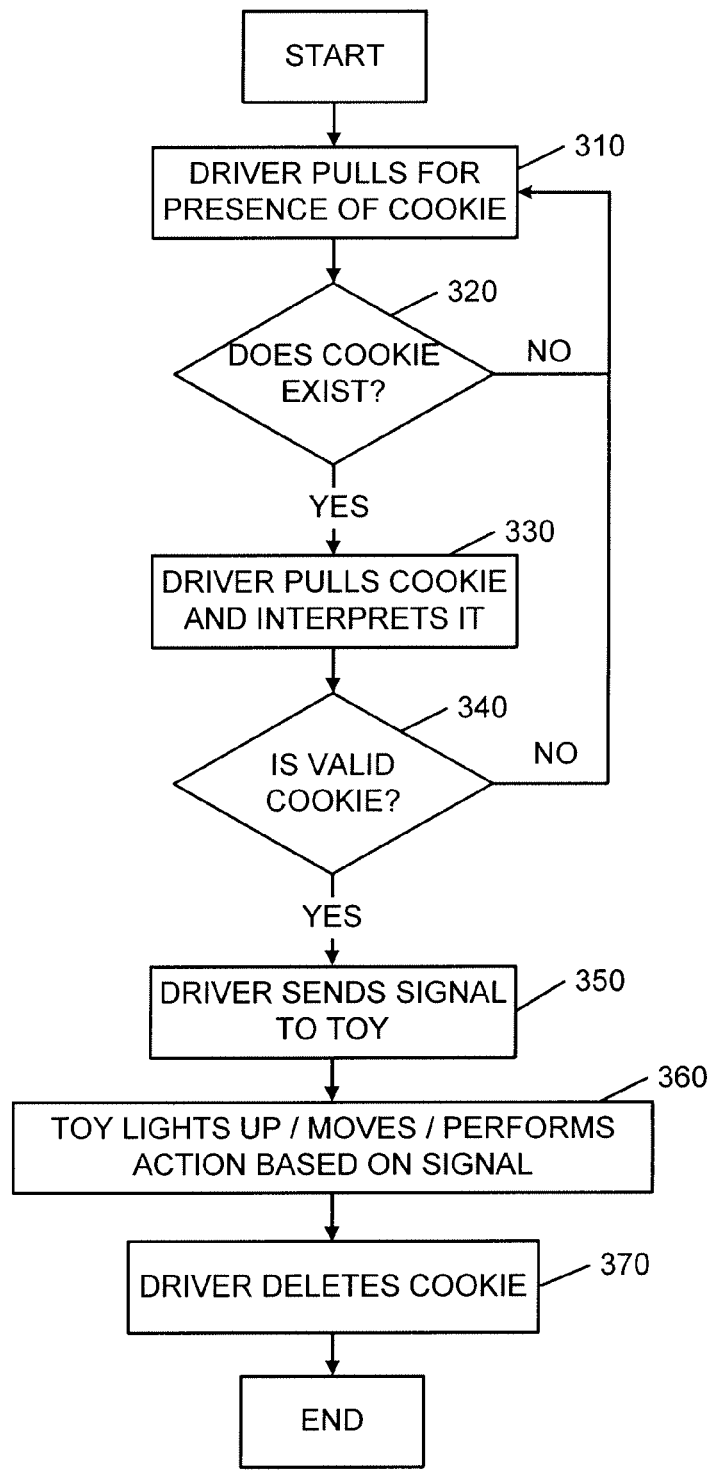
FIG. 14, illustrates the flow of a provided method.
Figure 15:
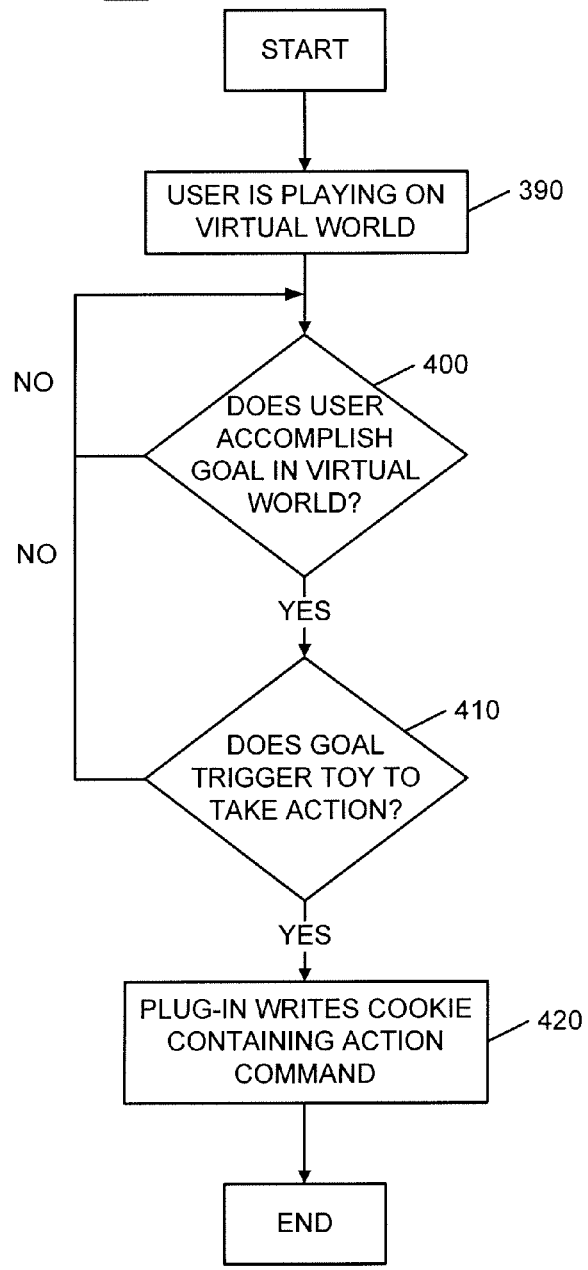
FIG. 15 illustrates the flow of a provided method.

At the heart of the interactive system provided by one embodiment is the user computer 80. Certain provided architecture and functionality is illustrated in FIGS. 13-15. FIG. 13 illustrates an embodiment of user computer 80. In this embodiment, user computer 80 is configured with browser environment 260 and driver 290. The virtual world hosted by server 100 is provided to a user through browser environment 260. In one embodiment, browser environment contains a web-browser with a software plug-in 270. Software plug-in 270 is capable of visually displaying the virtual world on display 20 of user computer 80. Many software plug-ins are known in the art and may be used to practice the current invention. An exemplary plug-in is a "Flash" plug-in well known in the art. In some embodiments, software plug-in 270 is capable of writing a file 280 through a write command. In these embodiments, the contents of file 280 are related to activities within the virtual world. Many file formats are known in the art and may be used to practice various embodiments the invention. An exemplary file is commonly known as a "cookie".

User computer 80, in embodiments where interactive toy 10 is capable of communication, is configured with driver 290. Driver 290 contains interpreter 300 which is configured to retrieve file 280 with a pull command, interpret the contents of file 280 and send action signals to interactive toy 10. The specific actions are described above. Further, in embodiments where interactive toy, can communicate with user computer 80, driver 290 may be configured to receive codes and other data from interactive toy 10 and communicate it to server 100 across network 90.

Operational flow of an exemplary driver 290 is illustrated in FIG. 14. In block 310 driver 290 issues a pull command to retrieve file 280. Flow continues to conditional block 320 where driver 290 determines if file 280 exists. If file 280 does not exist, flow returns to block 310 and periodically repeated. If it is determined in conditional block 320 that file 280 exists, flow continues to block 330 and file 280 is retrieved and interpreted by interpreter 300. Flow continues to conditional block 340 where the validity of file 280 is determined. If the file is not valid, flow continues back to block 310. If conditional block validates file 280, flow continues to block 350 where a signal is sent to interactive toy 10. In block 360 interactive toy 10 responds to the signal by performing an action. Flow continues to block 370 where file 280 is deleted.

Operational flow of an exemplary browser environment 260 is illustrated in FIG. 15. Server 100 provides virtual world to browser environment 260. Flow begins in block 390 where a user is playing on the provided virtual world. Flow continues to conditional block 400 where it is determined if the user accomplishes a predetermined goal within the virtual world. If the user has not achieved the goal flow remains within conditional block 400 until the goal is achieved. Once the goal is achieved, flow continues to conditional block 410 where it is determined if the achieved goal is one that should cause an action by interactive toy 10. If it is not flow continues back to conditional block 400 and waits for the next accomplishment. If conditional block 410 determines that the accomplished goal is one where interactive toy 10 action is appropriate, flow continues to block 420 where software plug-in 270 writes file 280.

Thus, it is seen that a system, methods and apparatus for interactive play are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of providing an interactive play experience the method comprising:
   displaying an authentication code on a display, the display attached to an interactive toy; authenticating the interactive toy on a server on a network;

providing a virtual world to a user computer connected to the network;

selecting one of another plurality of codes for display, the plurality of codes stored on a memory within the interactive toy;

validating the displayed another code on the server;

providing additional functionality within the virtual world based on the another code; and using the authentication code from the interactive toy to play a virtual world game on the server, wherein user interaction with a virtual image of the interactive toy of the virtual world on the server causes the computer to communicate with the interactive toy to cause an event to occur on the interactive toy when a target is reached within the game of the virtual world via said interaction, wherein the event is selected from the group consisting of illumination of lights on the interactive toy, emission of sounds from the interactive toy, and displaying of images on the display.

2. The method of claim 1, wherein the interactive toy further comprises a processor configured to control the display.

3. The method of claim 1, further comprising periodically displaying one of the plurality of codes on the display.

4. The method of claim 3, wherein the periodic display is in response to an interaction with the toy.

5. The method of claim 3, wherein the periodic display is on a timed basis.

6. The method of claim 3, wherein the periodic display is controlled on an achieved point basis, the achieved point basis derived from play with the interactive toy.

7. The method of claim 1, wherein the server hosts the virtual world.

8. The method of claim 1, wherein the network comprises a network selected from a group consisting of: a local area network, a wireless network, a metropolitan area network, and the Internet.

9. The method of claim 1, wherein the authentication of the interactive toy comprises executing a query on a database containing a set of authentication codes, and comparing the results of the query to the toy's authentication code.

10. The method of claim 1, wherein the virtual world includes a virtual toy with an appearance of the interactive toy.

11. The method of claim 1, wherein the user computer comprises a keyboard allowing a user to enter the code displayed on the display.

12. The method of claim 1, wherein the interactive toy further comprises a communications transceiver within the toy body, and a communications port, the user computer comprises a communications transceiver and a communications port, the method further comprising communicating a code from the interactive toy to the user computer.

13. The method of claim 12, wherein the interactive toy further comprises a light emitting diode connected to the processor.

14. The method of claim 13, wherein the processor is configured to illuminate the light emitting diode in response to receiving a signal from the communications port.

15. The method of claim 12, wherein the interactive toy further comprises a speaker connected to the processor.

16. The method of claim 15, wherein the processor is configured to cause the speaker to emit an audible sound in response to receiving a communications signal.

17. The method of claim 12, wherein the communications transceivers comprise transceivers selected from a group consisting of: wireless transceivers; Universal Serial Bus transceivers; FireWire transceivers, RFID transceivers; BlueTooth transceivers; WiFi transceivers; Ultra-Wideband transceivers, modem transceivers, wireless local area network transceivers, wireless personal area network transceivers, direct sequence spread spectrum transceivers, orthogonal frequency division multiplexing transceivers, and frequency hopping transceivers.

18. The method of claim 12, wherein the communication ports comprise ports selected from a group consisting of: wireless communication ports comprising an antenna, wired media communication ports, Universal Serial Bus ports, FireWire ports, and twisted pair wired media ports.

19. The method of claim 12, wherein the processor is configured to cause the toy's communications transceiver to communicate a code through the communications ports and the users computer is configured to receive the code and communicate it to the server.

20. The method of claim 1, wherein the server comprises a storage medium for storing data related to the interactive toy and the plurality of codes.

21. The method of claim 1, wherein each of the plurality of codes allows the server to serve to the user computer functionality unique to that code.

22. The method of claim 21, wherein the functionality unique to that code is served to the user computer when the code is verified on the server.

23. The method of claim 21, wherein the functionality comprises functionality selected from a group consisting of: additional virtual point totals in a virtual game, access to additional virtual worlds, access to additional virtual objects, access to additional virtual cash, and access to additional virtual games.

24. The method of claim 1, wherein the providing the virtual world to the user computer comprises displaying the virtual world on a web-browser application on the user computer.

25. The method of claim 1, wherein the virtual world provides a plurality of visual and audible activities to a user on the user computer.

* * * * *